United States Patent
Hashiba

(10) Patent No.: US 7,720,589 B2
(45) Date of Patent: May 18, 2010

(54) VEHICLE CONTROL DEVICE UTILIZING BRAKE HYDRAULIC PRESSURE

(75) Inventor: Hitoshi Hashiba, Nissin (JP)

(73) Assignee: Advics Co., Ltd., Kariya, Aichi (JP)

( * ) Notice: Subject to any disclaimer, the term of this patent is extended or adjusted under 35 U.S.C. 154(b) by 921 days.

(21) Appl. No.: 11/295,983

(22) Filed: Dec. 8, 2005

(65) Prior Publication Data

US 2006/0125314 A1    Jun. 15, 2006

(30) Foreign Application Priority Data

Dec. 13, 2004    (JP)    ............................. 2004-359977

(51) Int. Cl.
*B60T 7/12*    (2006.01)
(52) U.S. Cl. ............................. 701/83; 701/1; 701/70; 701/82; 180/271; 180/275; 180/276; 180/370; 303/113.2; 303/119.1; 303/119.3; 417/231; 477/182; 477/211
(58) Field of Classification Search ............... 701/83, 701/1, 70, 82; 303/113.1
See application file for complete search history.

(56) References Cited

U.S. PATENT DOCUMENTS

| | | | | |
|---|---|---|---|---|
| 4,812,806 | A * | 3/1989 | Freeman | 340/440 |
| 5,288,141 | A * | 2/1994 | Isshiki et al. | 303/119.3 |
| 6,205,887 | B1 * | 3/2001 | Barnreiter et al. | 74/606 R |
| 6,354,674 | B1 * | 3/2002 | Iwamoto et al. | 303/119.3 |
| 6,416,139 | B2 * | 7/2002 | Warner et al. | 303/119.3 |
| 6,634,723 | B1 * | 10/2003 | Parker et al. | 303/119.3 |

(Continued)

FOREIGN PATENT DOCUMENTS

DE    103 47 189 A1    5/2005

(Continued)

OTHER PUBLICATIONS

Official Action issued by the German Patent Office in counterpart German application, and English language translation of Official Action.

*Primary Examiner*—Khoi Tran
*Assistant Examiner*—Jonathan Sample
(74) *Attorney, Agent, or Firm*—Buchanan Ingersoll & Rooney PC

(57) ABSTRACT

A vehicle control device using brake hydraulic pressure includes a hydraulic unit having a housing and an electronic control unit having a casing. The housing of the hydraulic unit is mounted on a mounting surface of the casing of the electronic control unit so that the casing of the electronic control unit protrudes from the housing of the hydraulic unit to one side. On the protruding area of the casing, a bulge is formed in which a vehicle behavioral sensor is mounted. A control connector is also provided on the protruding area of the casing. The bulge does not protrude from the substantially square contour of the vehicle control device. Thus, the bulge will scarcely increase the installation space of the vehicle control device. A vehicle behavioral sensor is mounted on a small substrate. By adjusting the angle and position of the small substrate relative to a control substrate in the casing, the position of the sensor can be adjusted relative to the travel direction, lateral direction and vertical direction of the vehicle. With the position of the sensor adjusted, the small substrate is fixed to the bulge of the casing.

16 Claims, 6 Drawing Sheets

U.S. PATENT DOCUMENTS

| | | | |
|---|---|---|---|
| 6,678,591 B2 * | 1/2004 | Ohmura et al. | 701/29 |
| 6,799,812 B2 * | 10/2004 | Risch et al. | 303/119.2 |
| 6,869,152 B2 * | 3/2005 | Weh et al. | 303/116.4 |
| 6,908,162 B2 * | 6/2005 | Obayashi et al. | 303/152 |
| 6,931,912 B2 * | 8/2005 | Tsuchie et al. | 73/9 |
| 6,951,526 B2 * | 10/2005 | Kuhstrebe et al. | 477/97 |
| 6,961,649 B2 * | 11/2005 | Kato et al. | 701/70 |
| 7,424,347 B2 * | 9/2008 | Babala et al. | 701/1 |
| 2001/0022469 A1 | 9/2001 | Koyama | |
| 2002/0157502 A1 * | 10/2002 | Albert et al. | 74/731.1 |
| 2004/0015282 A1 * | 1/2004 | Babala et al. | 701/70 |
| 2004/0102888 A1 | 5/2004 | Burgdorf et al. | |
| 2004/0160120 A1 * | 8/2004 | Weh et al. | 303/119.3 |
| 2004/0163470 A1 * | 8/2004 | Babala et al. | 73/514.01 |
| 2005/0057092 A1 * | 3/2005 | Segawa | 303/116.4 |
| 2005/0057093 A1 * | 3/2005 | Segawa et al. | 303/119.3 |
| 2005/0160726 A1 * | 7/2005 | Lonn | 60/428 |
| 2005/0274192 A1 * | 12/2005 | Segawa et al. | 73/722 |

FOREIGN PATENT DOCUMENTS

| | | |
|---|---|---|
| JP | 08-011691 | 1/1996 |
| JP | 2001-260846 | 9/2001 |
| JP | 2004-506572 | 3/2004 |
| WO | WO 02/16179 A2 | 2/2002 |
| WO | WO 03/008244 A1 | 1/2003 |

* cited by examiner

VEHICLE CONTROL DEVICE UTILIZING BRAKE HYDRAULIC PRESSURE

BACKGROUND OF THE INVENTION

The present invention relates to a vehicle control device mounted in a vehicle brake hydraulic pressure control system such as an anti-lock brake system (ABS), a traction control system (TRC) or an electronic stability control system (ESC).

This type of vehicle control device is shown in FIG. 6. As shown, it includes a hydraulic unit (HU) 1, a motor M mounted on one side of the hydraulic unit, and an electronic control unit (ECU) mounted on the other side of the hydraulic unit. The hydraulic unit 1 includes a reservoir 3, a pump 4, control valves 5 for pressure increase, and control valves 6 for pressure reduction, which are all mounted in an aluminum housing 10. The housing 10 is formed with master cylinder ports 7 which communicate with wheel cylinder ports 8 through passages 9a in which the control valves 5 for pressure increase are provided. The wheel cylinder ports 8 also communicate with the reservoir 3 through passages 9b in which the control valves 6 for pressure reduction are provided. The reservoir 3 also communicates with the wheel cylinder ports 8 through passages 9c in which the pump 4 and the control valves 5 for pressure increase are provided.

The electronic control unit 2 includes a control substrate 21 mounted in a resin casing 20 for controlling the hydraulic pressure control valves 5 and 6. The hydraulic pressure control valves 5 and 6, motor M and other units are electrically connected to the control substrate 21. The control substrate 21 controls these units based on signals from various sensors such as wheel speed sensors (as disclosed in JP patent publications 8-11691 and 2001-260846 (both unexamined)). Various electronic control parts 23 are mounted on the control substrate 21. A power source/control connector 24 is mounted on the outer surface of the casing 20.

Normally, the control valves 5 for pressure increase are kept open while the control valves 6 for pressure reduction are kept closed. Thus, when the brake pedal is depressed in this state, hydraulic pressure is supplied from the master cylinder into the passages 9a through the master cylinder ports 7, and then into respective wheel cylinders through the control valves 5 for pressure increase and the wheel cylinder ports 8. The brakes are thus applied to the respective wheels.

If such a vehicle control device is mounted in a vehicle brake hydraulic pressure control system such as ABS, TRC or ESC, the control substrate 21 controls the hydraulic control valves 5 and 6 based on signals from various vehicle behavioral sensors, which are mounted on the control substrate 21, thereby controlling the respective wheel cylinder pressures during e.g. electronic stability control.

With increasing demands for more luxurious and safer motor vehicles, an increasing number of today's automobiles are equipped with driving dynamics sensors, which are a type of vehicle behavioral sensors, to detect the movement of the vehicle in every direction, thereby optimally controlling the brake hydraulic pressure based on the signals from these sensors so that the vehicle can travel more smoothly and safely.

Such driving dynamics sensors are ordinarily mounted at the center of gravity of the vehicle. However, the center of gravity of the vehicle is typically not located in the engine room, in which the vehicle control device is mounted. Thus, it is usually necessary to connect them together through a wire harness.

The use of a wire harness and connectors pushes up the cost of the device, and necessitates measures for fixing it to the vehicle body, which further pushes up the cost of the device. Also, a dedicated sensor bracket is necessary for fixing to the vehicle body. To solve this problem, JP patent publication 2004-506572 proposes to mount the driving dynamics sensors in the electronic control unit 2 of the vehicle control device.

In particular, this publication proposes to mount vehicle behavioral sensors such as driving dynamics sensors S in a bulge 20a (shown by chain line in FIG. 6) formed on the rear surface of the casing 20 of the electronic control unit 2.

The bulge 20a increases the dimension of the vehicle control device in the horizontal direction of FIG. 6. This is not desirable especially in view of the fact that it is acutely desired today that vehicle parts, including the vehicle control device, be as small as possible.

An object of the present invention is to provide a compact vehicle control device carrying vehicle behavioral sensors such as driving dynamics sensors in the electronic control unit.

SUMMARY OF THE INVENTION

In order to control today's sophisticated vehicle hydraulic pressure control systems such as ABS, TRC and ESC, it is necessary to mount a large number of electronic parts 23 on the control substrate 21. This necessitates a larger control substrate 21 and thus a larger casing 20 for the electronic control unit 2. The casing 20 thus typically protrudes laterally from the housing 10 of the hydraulic unit 1, as shown in FIG. 6. On the protruding portion of the casing 20, power source and control connectors 24 are mounted. It is possible to reduce the number of signal cables and thus the size of these connectors 24 if control signals are transmitted utilizing multiplexing such as time division multiplexing, frequency division multiplexing or wavelength division multiplexing.

As used herein, "vehicle behavioral sensors" include all kinds of sensors that can detect any behavior of the vehicle resulting from the control of brake hydraulic pressure, such sensors including driving dynamics sensors such as acceleration sensors for detecting acceleration in the travel direction of the vehicle and in the direction perpendicular to the travel direction of the vehicle, yaw rate sensors, roll rate sensors and pitch rate sensors.

According to the present invention, such vehicle behavioral sensors S are mounted in a space where the connectors 24 are mounted in the conventional device of FIG. 6.

As shown in FIG. 6, even if the sensors S are mounted in the space where the connectors 24 are mounted, the sensors S will not protrude from the outer edge of the substantially square contour of the vehicle control device. Thus, compared to the conventional arrangement of FIG. 6, in which the sensors are mounted in the bulge 20a formed on the rear surface of the casing 20, the vehicle control device takes up less mounting space.

Specifically, according to the present invention, there is provided a vehicle control device comprising a hydraulic unit comprising a housing and hydraulic pressure control valves mounted in the housing, an electronic control unit for controlling the hydraulic pressure control valves, the electronic control unit including a casing having a mounting surface on which the hydraulic unit is mounted so as not to protrude from the mounting surface, the mounting surface having a protruding area protruding from the hydraulic unit, a connector for the electronic control unit mounted on the protruding area, the protruding area being formed with a bulge, and a vehicle behavioral sensor mounted in the bulge.

The bulge may be provided on any portion of the protruding area. For example, the bulge may be formed on a portion of the protruding area where the connector is not mounted. Otherwise, the bulge may be provided between the connector and the control substrate mounted in the electronic control unit for controlling the hydraulic pressure control valves. In the latter case, the device has substantially the same contour as a conventional vehicle control device having no vehicle behavioral sensors. Thus, it takes up less mounting space.

Preferably, the bulge is provided vertically downward from the connector.

Typically, the center of gravity and the axis of rolling of a vehicle are located at a lower portion of the vehicle, while the vehicle behavioral sensor is located vertically upwardly of them. The nearer such vehicle behavioral sensor is located to the center of gravity and the center of rolling of the vehicle, the higher its accuracy. Thus, by providing the bulge vertically downward from the connector for the electronic control unit, the vehicle behavioral sensor, which is mounted in the bulge, can be located nearer to the center of gravity and the axis of rolling, so that its accuracy is higher, than when the sensor is provided vertically upward from the connector.

The sensor may be mounted on a small substrate supported on the control substrate.

Preferably, the small substrate has a first side edge thereof connected to the control substrate so as to extend transverse to the control substrate and to be inclinable relative to the control substrate, and has a second opposed side edge thereof fixed to an inner surface of the bulge. With this arrangement, with the small substrate positioned such that the vehicle behavior sensor is oriented in the right direction with respect to the travel direction, lateral direction and vertical direction of the vehicle (when the vehicle is on a horizontal surface), the small substrate is fixed in position.

The second side edge of the small substrate may be fixed to the inner surface of the bulge through a spherical bearing with the small substrate inclined at a predetermined angle relative to the control substrate. With this arrangement, the angle of the small substrate relative to the control substrate is easily adjustable by turning the spherical bearing. With the angle of the small substrate adjusted to a required value, the spherical shaft is fixed to the bulge of the casing.

Alternatively, the second side edge of the small substrate is fixed to the inner surface of the bulge with the small substrate inclined at a predetermined angle relative to the control substrate by passing an adjusting screw through the bulge, threading the adjusting screw into the small substrate near the second side edge thereof, and fixing the adjusting screw to the bulge. With this arrangement, by adjusting the depth of penetration of the screw, it is possible to adjust the angle of the small substrate to a required value relative to the control substrate. With the angle of the small substrate adjusted, the adjusting screw is fixed to the bulge so as not to be rotatable. The adjusting screw is preferably arranged so as to be operable from outside.

Since the position and angle of the vehicle behavioral sensor are adjustable simply by changing the position and angle of the small substrate, it is not necessary to change the design of e.g. the casing of the electronic control unit to adjust the position and angle of the sensor. Thus, such adjustments can be made at a low cost.

By transmitting control signals utilizing multiplexing such as time division multiplexing, frequency division multiplexing or wavelength division multiplexing, it is possible to reduce the number of signal cables and thus the size of the connector. This in turn makes it easier to form the bulge in which the vehicle behavioral sensor is mounted, and also makes it possible to minimize the size of the vehicle control device.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
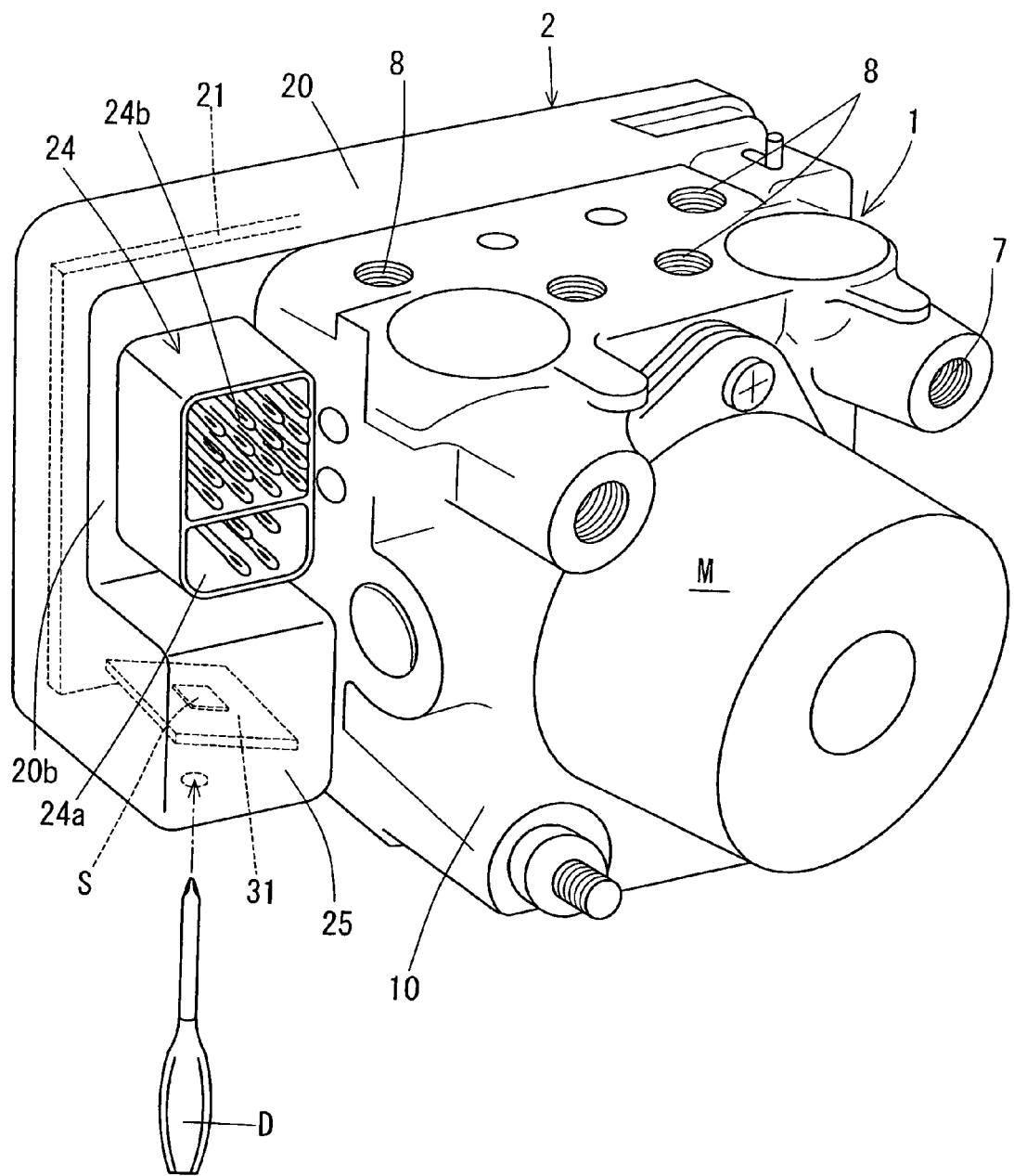
FIG. 1 is a perspective view of an embodiment of the present invention.
Figure 2:
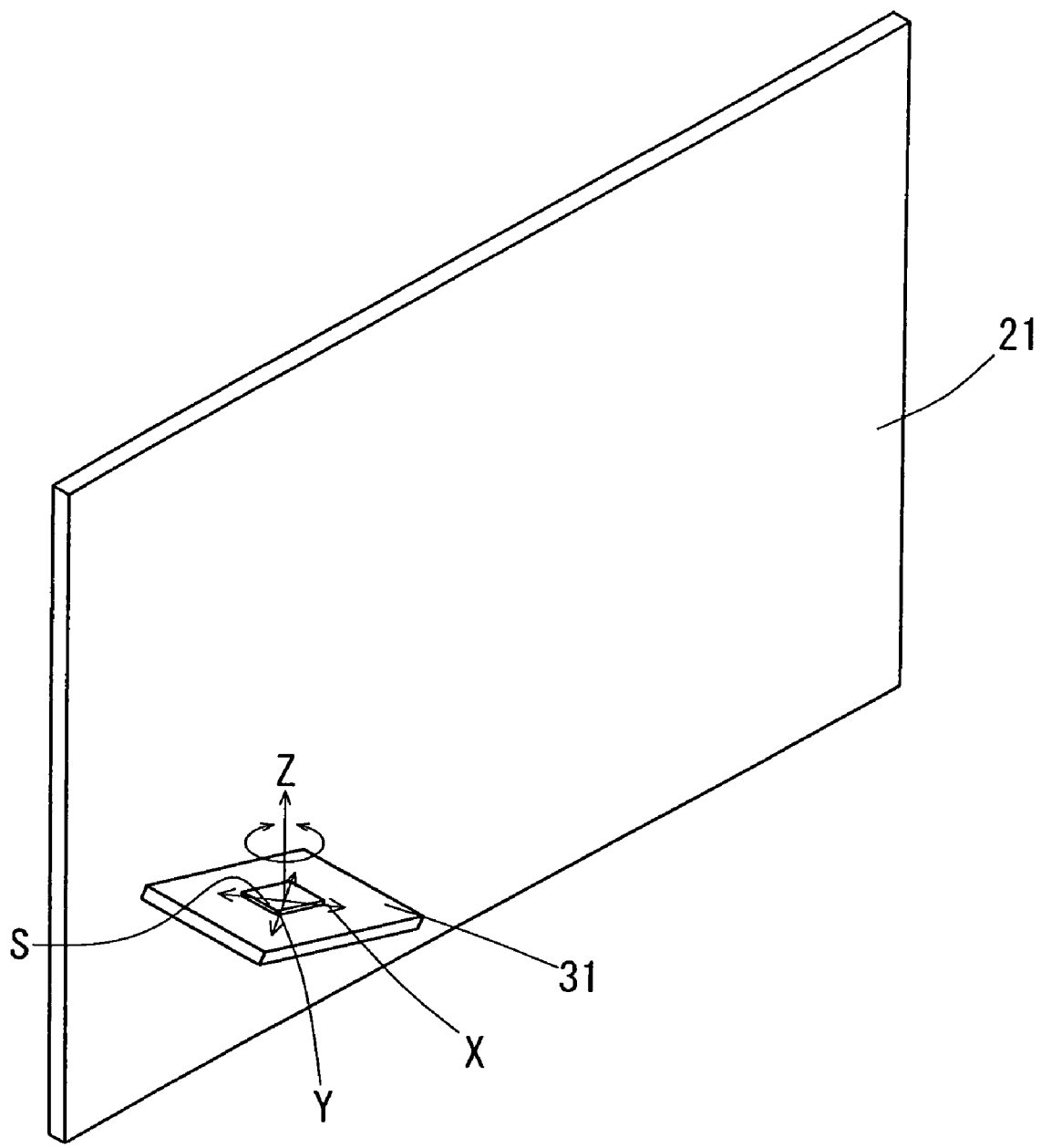
FIG. 2 is a perspective view of a control substrate of the embodiment of FIG. 1.
Figure 6:
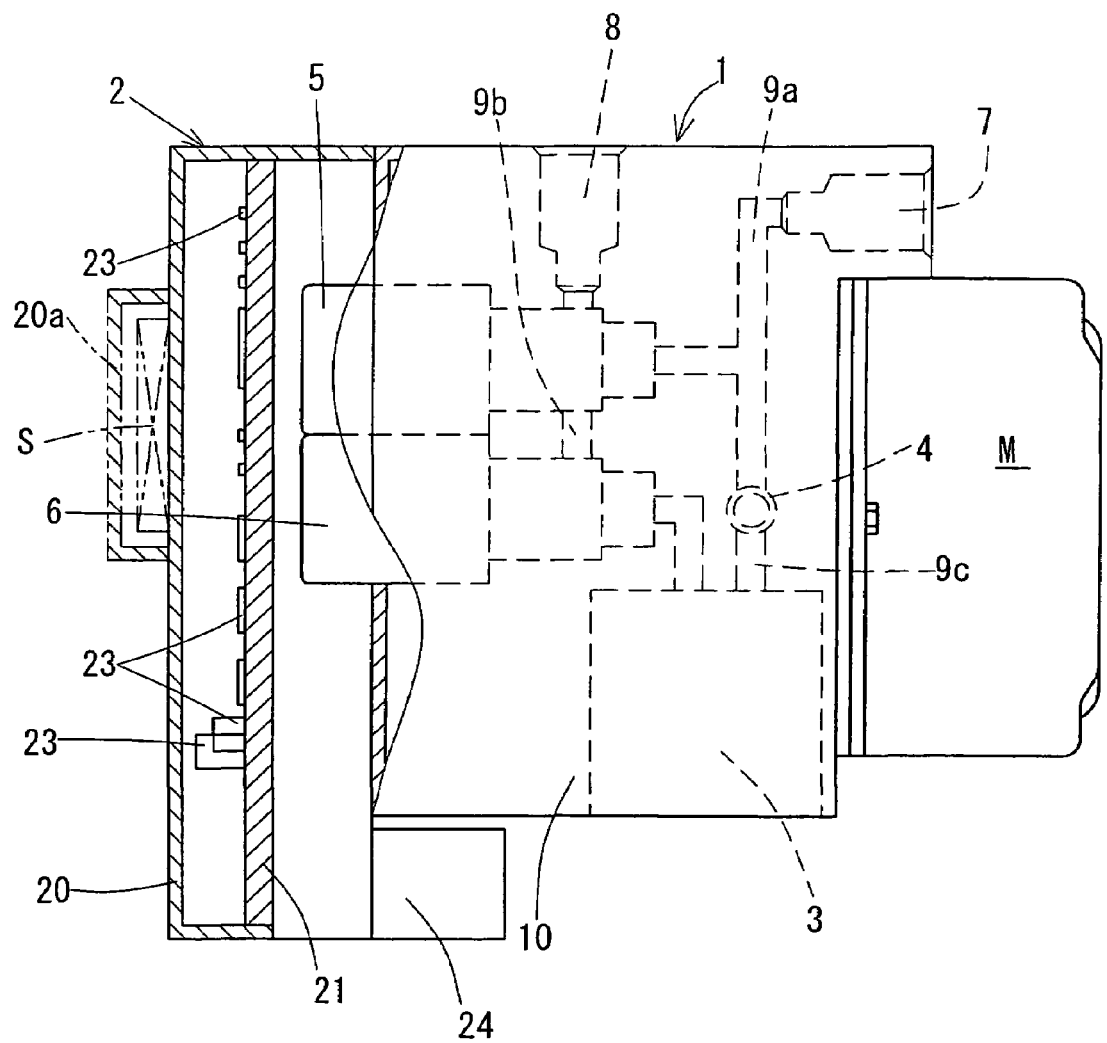
FIG. 6 is a sectional view of a conventional vehicle control device.

The embodiment of FIGS. 1 and 2 differs from the vehicle control device of FIG. 6 only in the structure of the electronic control unit 2. Thus, like elements are denoted by like numerals and their description is omitted.

As shown in FIG. 1, the hydraulic unit 1 is mounted on a mounting surface of the casing 20 of the electronic control unit 2 so as not to protrude from the mounting surface of the casing 20. An area 20b of the mounting surface (i.e. its left-hand side in FIG. 1) protrudes from the hydraulic unit 1.

The electronic control unit 2 includes a control substrate (main substrate) 21 mounted in the casing 20 and comprising a printed board on which various electronic parts 23 are mounted in the same manner as with conventional printed boards. The control substrate 21, as well as the casing 20, protrudes leftwardly (in FIG. 1) from the hydraulic unit 1.

On the area 20b of the mounting surface of the casing 20, a connector assembly 24 for the electronic control unit comprising a power source connector 24a and a control connector 24b (located over the connector 24a in FIG. 1) is mounted. The connector assembly 24 is preferably as small as possible. In the embodiment, the multiplex transmission system is used to reduce the number of terminals of the control connector 24b to 16. But the number of terminals of the connector assembly 24 is not particularly limited.

The area 20b is further formed with a bulge 25 under the connector assembly 24. In the bulge 25, a small substrate 31 is received which carries at least one vehicle behavioral sensor S. The small substrate 31 is in turn supported on the control substrate 21 so as to extend transverse to the substrate 21. The small substrate 31 may include an electronic circuit connected to the vehicle behavioral sensor S.

As shown in FIG. 2, the vehicle behavioral sensor S detects acceleration/deceleration in the direction in which the vehicle travels (X-axis direction) and/or in the direction perpendicular to the X-axis direction (Y-axis direction), and/or the yaw rate around the Z-axis which is perpendicular to both the X-axis and Y-axis directions. According to the type of vehicle brake hydraulic pressure control system (such as ESC) in which the vehicle control device according to the invention is mounted, the at least one vehicle behavioral sensor S may comprise one or a combination of yaw rate sensors and acceleration sensors. A yaw rate sensor picks up the yaw rate of the vehicle around the Z-axis. An acceleration sensor picks up the acceleration/deceleration in the X-axis and/or Y-axis directions.

Like conventional vehicle control devices, the vehicle control device according to the present invention is mounted in the engine room of a vehicle by means of brackets. Irrespective of the position of the vehicle control device and the control substrate 21 in the electronic control unit 2 relative to the vehicle, the small substrate 31 is positioned such that the at least one sensor S can detect behaviors of the vehicle with respect to the X-axis, Y-axis and/or Z-axis directions. With the small substrate 31 thus positioned, it is bonded, screwed or otherwise fixed along one side edge thereof to the main substrate 21 as shown in FIG. 2.

Figure 3:
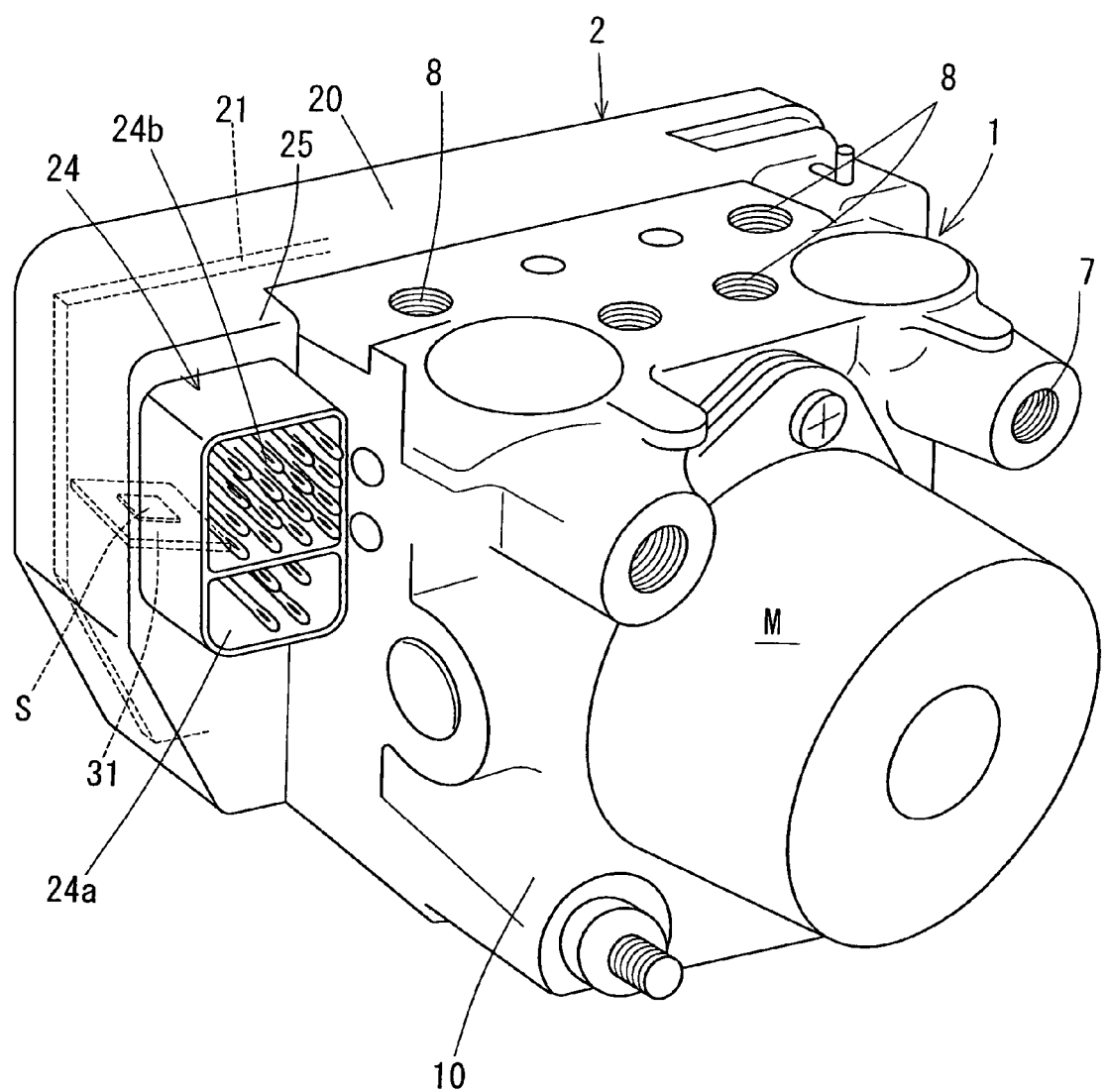
FIG. 3 is a perspective view of another embodiment of the present invention.

FIG. 3 shows another embodiment, in which the connector assembly 24 for the electronic control unit is mounted on the bulge 25. In this arrangement, the terminals of the connector assembly 24, especially those of the power source connector 24 are connected to the control substrate 21 so as not to interfere with the small substrate 31.

The vehicle control device of this embodiment has substantially the same shape and size as any such vehicle control device having no vehicle behavioral sensor S (the vehicle control device of FIG. 1 minus the bulge 25) as viewed from the front of the device. The vehicle control device of FIG. 3 thus takes up less installation space.

Figure 4A:
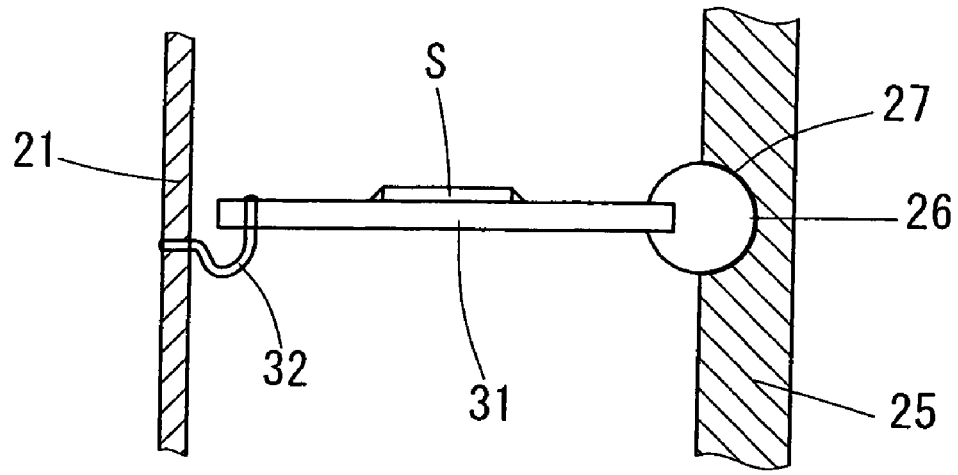
FIGS. 4A and 4B are sectional views of two different arrangements for mounting a small substrate carrying a vehicle behavioral sensor.
Figure 4B:
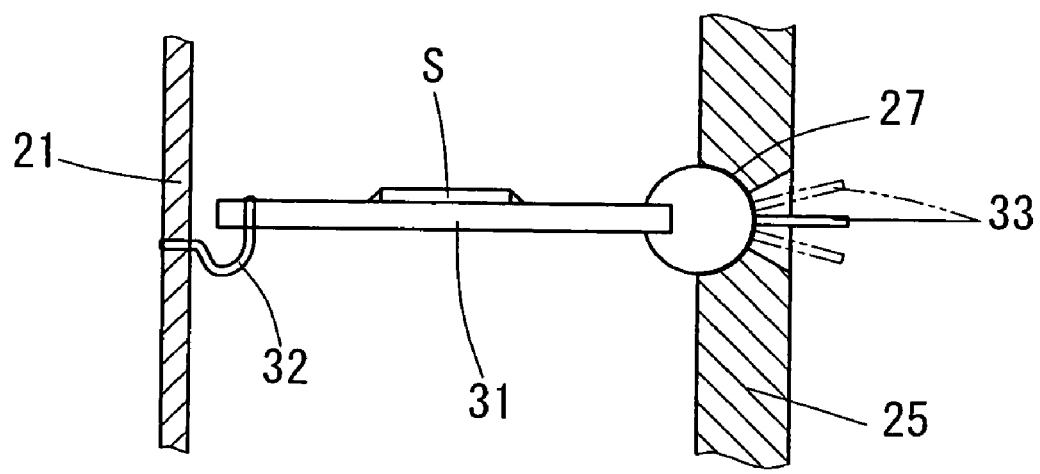
Figure 5A:
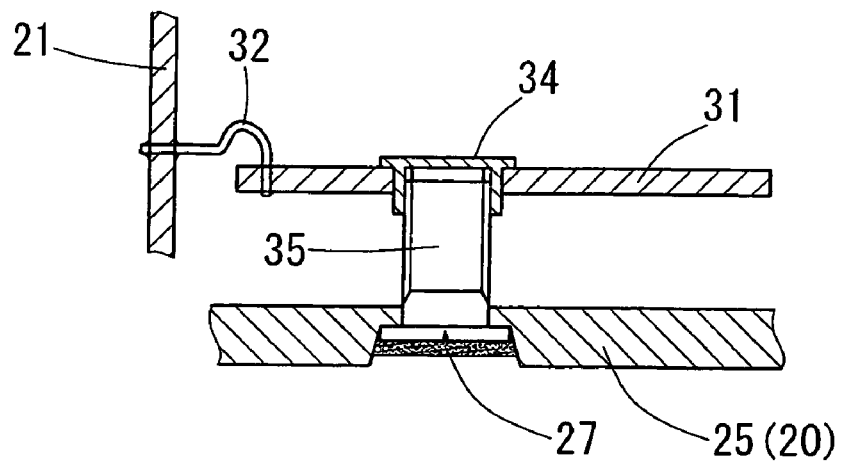
FIG. 5A is still another arrangement for mounting the small substrate.
Figure 5B:
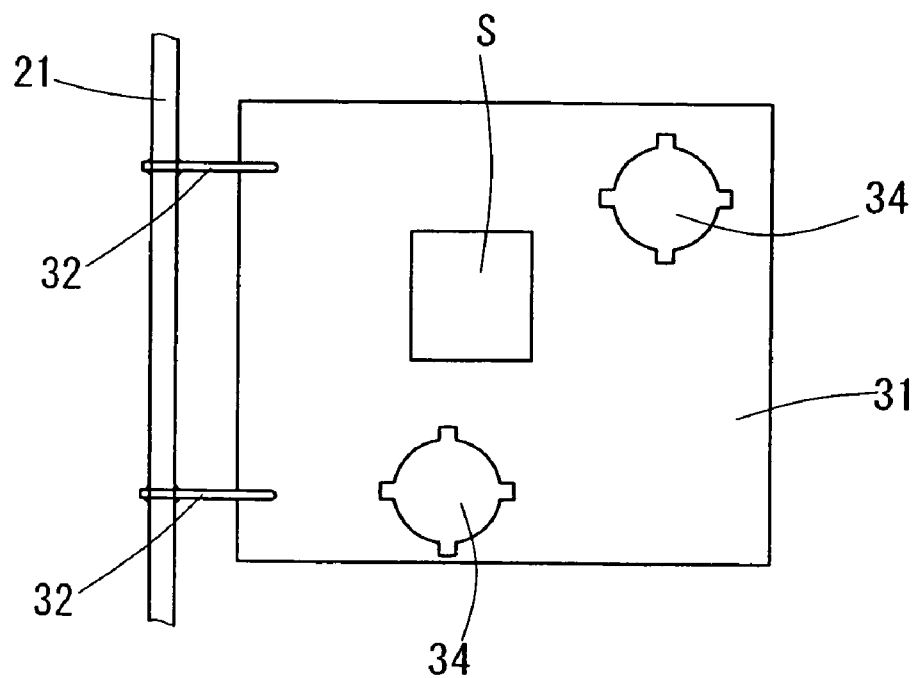
FIG. 5B is a plan view of FIG. 5A.

FIGS. 4 and 5 show two different arrangements for mounting the small substrate 31 to the control substrate 21. In the arrangement of FIGS. 4A and 4B, the small substrate 31 has one side edge thereof connected to the control substrate 21 through a flexible conductor piece 32 so as to be inclinable relative to the substrate 21. To the opposed side edge thereof, a spherical bearing 26 is mounted so as to be received in a recess formed in the inner wall of the bulge 25 of the casing 20. With this arrangement, the small substrate 31 can be inclined relative to the control substrate 21 by pivoting it about the spherical bearing 26. With the inclination angle of the small substrate 31 adjusted relative to the control substrate 21, the spherical bearing 26 is fixed in position by injecting adhesive 27 or with a screw.

In this arrangement, a pin 33 is preferably secured to the spherical bearing 26 so as to protrude from the bulge 25 of the casing 20 as shown in FIG. 4B so that by pivoting the pin 33 from outside as shown by chain lines in FIG. 4B, the inclination angle of the small substrate 31 is easily adjustable.

In the embodiment of FIG. 5, at least one nut 34 is mounted through the small substrate 31 near its side edge opposite to the side edge connected to the control substrate 21, and an adjusting screw 35 is passed through the wall of the bulge 25 of the casing 20 and threaded into the nut 34. With this arrangement, the inclination angle of the small substrate 31 relative to the control substrate 21 is adjusted by adjusting the depth of penetration of the screw into the nut 34. With the inclination angle of the small substrate 31 thus adjusted, the head of the adjusting screw 35 is fixed to the wall of the bulge 25 by injecting adhesive 27 or with a screw. The position of the nut 34 is not particularly limited. A plurality of such nuts 34 may be provided so that the position of the small substrate 31 is adjustable in three directions, i.e. X-, Y- and Z-axis directions. Instead of the nut 34, a threaded hole may be formed in the small substrate 31.

As shown in FIG. 1, the adjusting screw 35 may be passed through the bottom wall of the bulge 25. With this arrangement it is possible to finely adjust the inclination angle of the small substrate 31 by inserting a screwdriver D from under the bulge 25 to turn the adjusting screw even after the vehicle control device has been mounted on a vehicle frame through brackets.

What is claimed is:

1. A vehicle control device comprising:
a hydraulic unit comprising a housing and hydraulic pressure control valves mounted in said housing,
an electronic control unit for controlling said hydraulic pressure control valves, said electronic control unit including a casing having a mounting surface on which the housing of said hydraulic unit is mounted, said housing being mounted on the mounting surface so as not to protrude laterally beyond an outer periphery said mounting surface, the housing protruding perpendicularly away from the mounting surface in one direction, the casing of the electronic control unit having a protruding portion protruding from the housing of said hydraulic unit in a direction substantially parallel to the mounting surface,
a connector for said electronic control unit mounted on said protruding portion so that the connector and the housing are mounted on a common side of the casing, said protruding portion having a bulge, and
a vehicle behavioral sensor mounted in said bulge, the bulge and the connector protruding in the one direction from the protruding portion and in the one direction from a plane containing the mounting surface.

2. The vehicle control device of claim 1 wherein said connector is mounted on a portion of said protruding portion where said bulge is not formed.

3. The vehicle control device of claim 1 wherein said bulge is provided vertically downward from said connector.

4. The vehicle control device of claim 1 wherein said electronic control unit includes a control substrate mounted in said casing for controlling said hydraulic pressure control valves, said bulge being disposed between said connector and said control substrate so as not to protrude from said protruding portion.

5. The vehicle control device of claim 1 wherein said electronic control unit includes a control substrate mounted in said casing for controlling said hydraulic pressure control valves, and said sensor is mounted on a small substrate supported on said control substrate.

6. The vehicle control device of claim 5 wherein said small substrate has a first side edge thereof connected to said control substrate so as to extend transverse to said control substrate and to be inclinable relative to said control substrate, and has a second opposed side edge thereof fixed to an inner surface of said bulge.

7. The vehicle control device of claim 6 wherein said second side edge of said small substrate is fixed to said inner surface of said bulge through a spherical bearing with said small substrate inclined at a predetermined angle relative to said control substrate.

8. The vehicle control device of claim 6 wherein said second side edge of said small substrate is fixed to the inner surface of said bulge with said small substrate inclined at a predetermined angle relative to said control substrate by passing an adjusting screw through said bulge, threading said adjusting screw into said small substrate near said second side edge thereof, and fixing said adjusting screw to said bulge.

9. The vehicle control device of claim 8 wherein said adjusting screw is operable from outside said casing.

10. The vehicle control device of claim 9 wherein signals are transmitted through said connecter by multiplex transmission.

11. A vehicle control device comprising:
a hydraulic unit comprising a housing and hydraulic pressure control valves mounted in said housing,
an electronic control unit for controlling said hydraulic pressure control valves, said electronic control unit including a casing having a mounting surface on which the housing of said hydraulic unit is mounted, said housing being mounted on the mounting surface so as not to protrude laterally beyond an outer periphery said mounting surface, the housing protruding perpendicularly away from the mounting surface in one direction, the casing of the electronic control unit having a protruding portion protruding from the housing of said hydraulic unit in a direction substantially parallel to the mounting surface,
a connector for said electronic control unit mounted on said protruding portion so that the connector and the housing are mounted on a common side of the casing, said protruding portion having a bulge, and
a vehicle behavioral sensor unit mounted in said bulge, the bulge and the connector protruding in the one direction from the protruding portion and in the one direction from a plane containing the mounting surface, wherein the vehicle behavioral sensor unit is the only element provided in the bulge such that no other element besides the vehicle behavioral sensor unit is provided in the bulge.

12. The vehicle control device of claim 11 wherein the vehicle behavioral sensor unit comprises a sensor and a sensor substrate.

13. The vehicle control device of claim 12 wherein the vehicle behavioral sensor unit further comprises an adjusting screw.

14. The vehicle control device of claim 13 wherein a side edge of the sensor substrate is fixed to the inner surface of the bulge with the sensor substrate inclined at a predetermined angle relative to a control substrate provided in the electronic control unit by threading the adjusting screw into the sensor substrate near the side edge of the sensor substrate, and fixing the adjusting screw to the bulge.

15. The vehicle control device of claim 14 wherein the adjusting screw is operable from outside the casing.

16. A vehicle control device comprising:
a hydraulic unit comprising a housing and hydraulic pressure control valves mounted in the housing,
an electronic control unit for controlling said hydraulic pressure control valves, the electronic control unit including a casing having a mounting surface on which the housing of the hydraulic unit is mounted, the casing of the electronic control unit having a protruding portion protruding from the housing of the hydraulic unit in a direction substantially parallel to the mounting surface, the protruding portion having a bulge, and
a vehicle behavioral sensor unit mounted in the bulge, the vehicle behavioral sensor unit being the only element provided in the bulge such that no other element besides the vehicle behavioral sensor unit is provided in the bulge.

* * * * *